US010337883B2

(12) United States Patent
Johnson et al.

(10) Patent No.: US 10,337,883 B2
(45) Date of Patent: Jul. 2, 2019

(54) ACCELERATION CORRECTED ATTITUDE ESTIMATION SYSTEMS AND METHODS

(71) Applicant: FLIR Systems, Inc., Wilsonville, OR (US)

(72) Inventors: Mark Johnson, Vannes (FR); Warwick Mills, Hampshire (GB); Chris Yeomans, Fareham (GB); Paul Stokes, Fleet (GB)

(73) Assignee: FLIR SYSTEMS, INC., Wilsonville, OR (US)

( * ) Notice: Subject to any disclaimer, the term of this patent is extended or adjusted under 35 U.S.C. 154(b) by 320 days.

(21) Appl. No.: 15/239,760

(22) Filed: Aug. 17, 2016

(65) Prior Publication Data
US 2017/0184414 A1 Jun. 29, 2017

Related U.S. Application Data

(63) Continuation of application No. PCT/US2015/015281, filed on Feb. 10, 2015.

(60) Provisional application No. 61/942,517, filed on Feb. 20, 2014.

(51) Int. Cl.
*G01C 21/16* (2006.01)
*G01C 21/18* (2006.01)
*G01C 23/00* (2006.01)

(52) U.S. Cl.
CPC ........... *G01C 23/00* (2013.01); *G01C 21/165* (2013.01); *G01C 21/18* (2013.01)

(58) Field of Classification Search
CPC ..................................................... G01C 23/00
See application file for complete search history.

(56) References Cited

U.S. PATENT DOCUMENTS

| 2,968,957 | A | 1/1961 | Condie et al. | |
| 8,275,544 | B1 | 9/2012 | Wells et al. | |
| 2003/0149528 | A1 | 8/2003 | Lin | |
| 2009/0254279 | A1* | 10/2009 | Han | G01C 21/16 |
| | | | | 701/501 |
| 2011/0307213 | A1* | 12/2011 | Zhao | G01C 17/30 |
| | | | | 702/153 |

(Continued)

FOREIGN PATENT DOCUMENTS

| CN | 102692225 | 9/2012 |
| CN | 103149948 | 6/2013 |

*Primary Examiner* — Manuel L Barbee
*Assistant Examiner* — Raymond L Nimox
(74) *Attorney, Agent, or Firm* — Haynes and Boone, LLP

(57) ABSTRACT

Techniques are disclosed for systems and methods to provide accurate attitude estimation for a mobile structure. An attitude estimation system includes a logic device in communication with a gyroscope, an accelerometer, and/or a speed sensor. Sensor signals provided by the various sensors are used to determine an estimated absolute coordinate frame relative to the mobile structure, which can be referenced to the Earth's gravity. Angular velocities provided by the gyroscope are transformed to the estimated absolute coordinate frame and used to determine a stabilized attitude estimate for the mobile structure. The stabilized attitude estimate may be displayed to a user, used to calculate a heading or route for the mobile structure, and/or used to adjust a steering actuator, a propulsion system thrust, and/or other operational systems of the mobile structure.

20 Claims, 9 Drawing Sheets

(56) References Cited

U.S. PATENT DOCUMENTS

| | | | | |
|---|---|---|---|---|
| 2012/0136573 A1* | 5/2012 | Janardhanan | ........ | G01C 21/165 |
| | | | | 701/512 |
| 2012/0245839 A1* | 9/2012 | Syed | .................... | G01C 21/165 |
| | | | | 701/408 |
| 2013/0090881 A1* | 4/2013 | Janardhanan | ........ | G01C 22/006 |
| | | | | 702/104 |
| 2015/0088419 A1* | 3/2015 | Bhardwaj | ............ | G01C 21/165 |
| | | | | 701/472 |

\* cited by examiner

```
function [RollPtch,Bias] = stabilised_rp_detector (accel,fTC,bTC,hold_bias,gyro)

x=1;
y=2;
z=3;
dt=fTC(3);

k=10;

persistent Roll;
persistent Ptch;
persistent x_bias;
persistent y_bias;

if accel(3) == 0 %protect for divide by zero
    accel(3) = 0.000001;
end

AbsRoll = atan(accel (2)/accel(3));                                                    ⎫ 802
accel = Rx (-AbsRoll,accel);                                                           ⎬
AbsPtch = atan(-accel(1)/accel(3));                                                    ⎭ if isempty (Roll)                                                                      ⎫ 804
    Roll = AbsRoll;                                                                    ⎬
    Ptch = AbsPtch;                                                                    ⎭
    x_bias = single(0);
    y_bias = single(0);
else
    Roll = Roll + dt*((AbsRoll-Roll)/fTC(1) + cos(AbsPtch)*gyro(x) + sin(AbsPtch)*gyro(z));   ⎫ 806
    Ptch = Ptch + dt*((AbsPtch-Ptch))/fTC(2) + cos(AbsRoll)*gyro(y) - sin(AbsRoll)*gyro(z);    ⎬
    if ~hold_bias                                                                              ⎭
        x_bias = x_bias - dt*(AbsRoll-Roll/k*bTC(1));                                  ⎫ 808
        y_bias = y_bias - dt*(AbsPtch-Ptch)/(k*bTC(2));                                ⎬
    end                                                                                ⎭
end RollPtch = [Roll;Ptch];
Bias = [x_bias;y_bias;single(0)];
```

FIG. 8

ACCELERATION CORRECTED ATTITUDE ESTIMATION SYSTEMS AND METHODS

CROSS-REFERENCE TO RELATED APPLICATIONS

This application is a continuation of International Application No. PCT/US2015/015281 filed Feb. 10, 2015 and entitled "ACCELERATION CORRECTED ATTITUDE ESTIMATION SYSTEMS AND METHODS" which is hereby incorporated by reference in its entirety.

International Application No. PCT/US2015/015281 filed Feb. 10, 2015 claims the benefit of U.S. Provisional Patent Application No. 61/942,517 filed Feb. 20, 2014 and entitled "ACCELERATION CORRECTED ATTITUDE ESTIMATION SYSTEMS AND METHODS" which is hereby incorporated by reference in its entirety.

TECHNICAL FIELD

One or more embodiments of the invention relate generally to attitude estimation and more particularly, for example, to systems and methods for providing accurate attitude estimations for mobile structures.

BACKGROUND

The Earth's gravitational field has long been used to provide a reference from which to estimate absolute roll and pitch attitudes. Absolute yaw attitudes, or headings, may be derived from the Earth's magnetic field. Conventionally, an accelerometer or fluid level is used to measure instantaneous absolute roll and pitch relative to a gravitationally defined "down" vector, but these types of measurements quickly become noisy and unreliable in the presence of non-gravitational accelerations.

Theoretically, gyroscopes may be used to measure changes in orientation over time, and these changes can be integrated to provide estimations of roll and pitch attitudes, but actual low drift gyroscopes (e.g., that can measure relative orientations accurately over long periods of time) can be extremely expensive, are typically relatively fragile, and can become unreliable when subjected to sustained and/or abrupt non-gravitational accelerations. Thus, there is a need for an improved methodology to provide accurate and reliable attitude estimations using inexpensive sensors, particularly in the context of monitored mobile structures that are subject to sustained and/or abrupt non-gravitational accelerations.

SUMMARY

Techniques are disclosed for systems and methods to provide accurate attitude estimation for mobile structures. An attitude estimation system may include a logic device in communication with a gyroscope, an accelerometer, and/or a speed sensor. Sensor signals provided by the various sensors may be used to determine an estimated absolute coordinate frame relative to the mobile structure, which can be referenced to the Earth's gravity. Angular velocities provided by the gyroscope may be transformed to the estimated absolute coordinate frame and used to determine a stabilized attitude estimate for the mobile structure. The stabilized attitude estimate may be displayed to a user, used to calculate a heading or route for the mobile structure, and/or used to adjust a steering actuator, a propulsion system thrust, and/or other operational systems of the mobile structure.

In various embodiments, an attitude estimation system may include a gyroscope, an accelerometer, a speed sensor, one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to receive one or more sensor signals and determine a stabilized attitude estimate for a mobile structure, where the logic device is adapted to receive an angular velocity, an acceleration, and/or a speed of the mobile structure; determine an estimated absolute coordinate frame based, at least in part, on the angular velocity, the acceleration, and/or the speed; and determine the stabilized attitude estimate based, at least in part, on the angular velocity and/or the estimated absolute coordinate frame.

In another embodiment, a method may include determining an estimated absolute coordinate frame based, at least in part, on an angular velocity, an acceleration, and/or a speed of a mobile structure; and determining a stabilized attitude estimate for the mobile structure based, at least in part, on the angular velocity and/or the estimated absolute coordinate frame.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 illustrates source code and/or pseudocode of various functions and other operations to provide attitude estimation in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
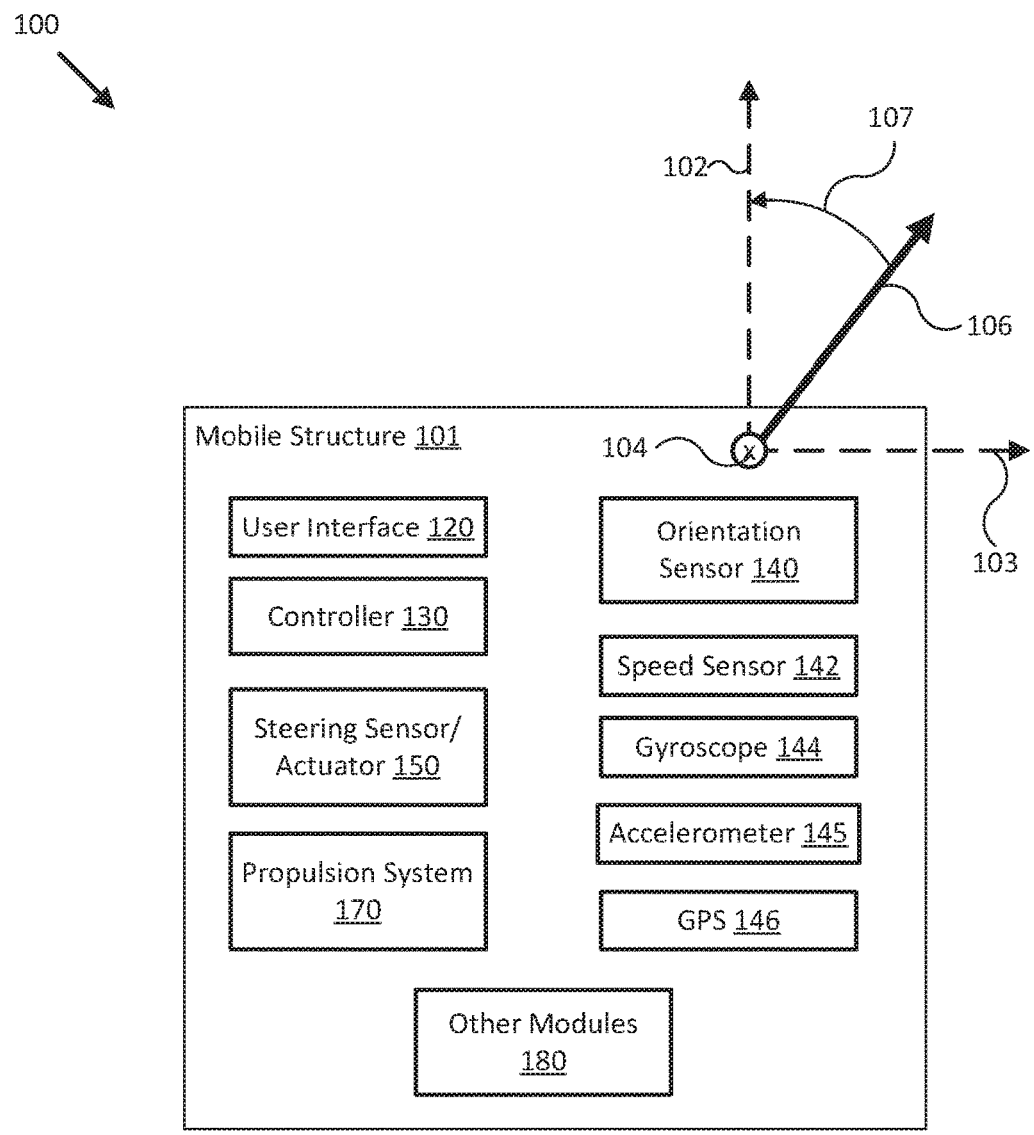
FIG. 1 illustrates a block diagram of an attitude estimation system in accordance with an embodiment of the disclosure.

In accordance with various embodiments of the present disclosure, attitude estimation systems and methods may advantageously include a controller in conjunction with a gyroscope, an accelerometer, and/or a speed sensor providing measurements of an angular velocity, an acceleration, and/or a speed of a mobile structure. For example, the sensors may be mounted to or within the mobile structure (e.g., a watercraft, aircraft, motor vehicle, and/or other mobile structure), or may be integrated with the controller. Embodiments of the present disclosure can reliably estimate an attitude for a mobile structure using an angular velocity, acceleration, and/or speed of the mobile structure. Any such embodiments may be used to provide reliable absolute/stabilized attitude estimations while the mobile structure is experiencing non-gravitational accelerations and using relatively inexpensive sensors.

Measurements or images captured from devices mounted to a mobile structure often suffer from motion related sensory artifacts, such as blurring, jitter, poor aiming, and/or other motion effects. These motion effects can be compensated for with accurate fast attitude information for the moving structure (e.g., pitch and roll). This has been performed historically using an attitude heading reference system (AHRS) and/or a motion stabilized platform, both of which are relatively expensive. Conventional AHRS are expensive because they operate by combining low drift gyroscope, accelerometer, and magnetometer data using complex multidimensional Kalman filters, all of which requires a high level of calibration for the sensors and relatively large amounts of memory and processing resources. Motion stabilized platforms are expensive because their motors and mechanics are required to move with speed and precision. Moreover, both systems are relatively fragile, particularly in the context of watercraft and/or other relatively open mobile structures and/or vehicles that typically experience harsh environmental conditions. By contrast, mass market applications prefer lower cost solutions. Embodiments of the present disclosure provide high quality attitude data inexpensively (e.g., sub $5 bill of additional materials cost).

As described herein, an attitude estimation system may be configured to determine stabilized attitude estimations for a mobile structure using angular velocities, accelerations, and speeds of the mobile structure. In some embodiments, a speed of a mobile structure may be chosen from a variety of sources and/or combination of sources. For example, in embodiments where the mobile structure corresponds to a watercraft, both a global positioning satellite (GPS) derived speed over ground (SOG) and a paddlewheel speed through the water (STW) may be available. In such embodiments, the speed of the watercraft may be determined from both the SOG and the STW. For example, the speed may be determined by choosing the largest of SOG and STW, by choosing SOG or STW or an interpolation between SOG and STW based on motion of the mobile structure, and/or using other selection and/or computational methods. Such methods may be used as mechanisms to overcome issues with stuck or damaged paddle wheels (e.g., due to algae and/or running aground) and/or aerating paddle wheels (e.g., due to high speed, cavitation, bow lifting out of the water, and/or other causes).

Once a speed of the mobile structure is determined, a corresponding longitudinal (e.g., fore/aft) acceleration and/or acceleration correction may be computed by differentiating the speed with respect to time, and any centripetal acceleration may be computed using the methods described herein. For example, a multi-component centripetal acceleration of the mobile structure may be computed by multiplying the speed by the mobile structure's angular velocity (e.g., for each component), and the result may be used to remove the centripetal acceleration from the acceleration of the mobile structure (e.g., the raw multi-dimensional linear acceleration data provided by an accelerometer). The centripetal acceleration may be removed from both the lateral and the vertical components of the acceleration: the yaw component of the angular velocity (e.g., about the vertical axis of the mobile structure's local coordinate frame) may be multiplied by the speed, and the result may be subtracted from the lateral component of the acceleration to remove the "turning" centripetal acceleration contribution; the pitch component of the angular velocity (e.g., about the lateral axis of the mobile structure's local coordinate frame) may be multiplied by the speed, and the result may be added to the vertical component of the acceleration to remove the "pitching" centripetal acceleration contribution (e.g., a watercraft heeled over hard while turning fast will detect a significant centripetal acceleration contribution corresponding to the pitch component of its angular velocity). The resulting "corrected" acceleration is referred to herein as the motion compensated acceleration of the mobile structure.

Conventionally, errors in the yaw component of the angular velocity related to sensor drift (e.g., as measured by a gyroscope) are not readily correctable in a low cost attitude sensor due to lack of a reliable, accurate, and low noise reference. In some embodiments, a deadband filter may be applied to the yaw component of the angular velocity to reduce the accumulated error effects associated with small offsets and/or associated sensor drift. In other embodiments, course over ground (COG) tracking from a GPS (e.g., a series of positions of the mobile structure) may be used to determine a calculated yaw component of the angular velocity, for example, or to periodically correct for accumulated errors. In still further embodiments, the yaw component, the deadband filtered yaw component, and/or the series of positions may be combined, interpolated, and/or filtered together to determine a calculated yaw component of the angular velocity.

Once the motion compensated acceleration is determined, it may be combined with the angular velocity to produce a stabilized attitude estimate (e.g., a roll and a pitch referenced to an estimated absolute coordinate frame, such as a local gravitational vector) as follows: an angular velocity of the mobile structure may be used to propagate from a previous attitude estimate directly to the new attitude estimate by integrating the angular velocity (e.g., multiplying the angular velocity by the appropriate time interval) to obtain the present changes in attitude (e.g., pitch and roll, in the time interval). In some embodiments, the angular velocity is first transformed (e.g., using a coordinate frame transformation) to an absolute coordinate frame, and the transformed angular velocity is used to propagate to the new attitude estimate. In various embodiments, the absolute coordinate frame may be estimated from the motion compensated acceleration, for example, and/or may be referenced to a local gravitational vector, an estimated horizon, a line of sight vector, and/or other positional and/orientation references.

For example, the longitudinal and lateral components of the motion compensated acceleration may be used, in the form of ratios with a corresponding vertical component, to determine an estimated absolute attitude (e.g., roll and pitch), which may correspond to an estimated absolute coordinate frame relative to the mobile structure. This estimated absolute attitude should roughly correspond to the actual attitude for the mobile structure, but the estimated absolute attitude is typically relatively noisy and/or unstable due to effects related to the motion of the mobile structure. In some embodiments, the estimated absolute attitude may be used to improve the stabilized attitude estimate provided by the integrated angular velocity of the mobile structure, such that a corresponding time constant (e.g., the crossover time constant between motion compensated acceleration and angular velocity dominance) is typically set to many seconds (e.g., typically around 20 seconds).

In various embodiments, the angular velocities used to propagate from a previous attitude estimate may be bias corrected angular velocities configured to compensate for sensor drift affecting the angular velocity measurements, as described herein. Moreover, the corresponding bias correction factors (e.g., roll and pitch biases) may be refined over time: if the attitude estimation leads to an estimation error (e.g., relative to the estimated absolute attitude derived from the motion compensated acceleration), then the bias correction factors may be adjusted accordingly, as described more fully herein. In some embodiments, a time constant for the bias adjustment may be set to approximately twice that of the crossover time constant (e.g., approximately 40 seconds). In various embodiments, the bias and crossover time constants can be longer if higher quality gyroscopes with better drift stability are used. However, particularly with respect to marine applications, sea disturbances lasting longer than 20 s are generally small in acceleration amplitude, and so the real world benefit derived from using more expensive gyroscopes is minimal.

It is important to note that bias adjustment is critical to reliable operation; poor bias accuracy can lead to a rapid build-up of error in an attitude estimation. If the speed of the mobile structure is not known accurately, then the centripetal acceleration calculation will be inaccurate. Moreover, roll and pitch components of the angular velocity typically become less accurate during high speed turns. Because bias adjustment sensitivity to speed accuracy increases with speed, bias adjustment errors can be reduced by locking out bias adjustment at relatively high speeds, at conditions of high centripetal accelerations, and/or at high turn rates (e.g., a yaw component of the angular velocity).

FIG. 1 illustrates a block diagram of an attitude estimation system 100 in accordance with an embodiment of the disclosure. In various embodiments, system 100 may be adapted to measure an angular velocity, an acceleration, and a speed of mobile structure 101. System 100 may then use these measurements to determine an estimated absolute coordinate frame (e.g., an estimated absolute roll and/or pitch) relative to mobile structure 101. System 100 may determine a stabilized attitude estimate (e.g., stable over time with respect to an absolute coordinate frame) from the angular velocity and the estimated absolute coordinate frame. In various embodiments, system 100 may display the stabilized attitude estimate to a user through user interface 120, and/or use the stabilized attitude estimate to control operation of mobile structure 101, such as controlling steering actuator 150 and/or propulsion system 170 to orient mobile structure 101 according to a desired heading, such as heading angle 107, for example.

In the embodiment shown in FIG. 1, system 100 may be implemented to provide stabilized attitude estimates for a particular type of mobile structure 101, such as an aerial drone, a watercraft, an aircraft, a robot, a vehicle, and/or other types of mobile structures. In one embodiment, system 100 may include one or more of a user interface 120, a controller 130, an orientation sensor 140, a speed sensor 142, a gyroscope 144, an accelerometer 145, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

User interface 120 may be implemented as a display, a touch screen, a keyboard, a mouse, a joystick, a knob, a steering wheel, a ship's wheel or helm, a yolk, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine estimated absolute coordinate frames and/or stabilized attitude estimates, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an angular velocity, an acceleration, a speed, and/or a position of mobile structure 101. In such embodiment, user interface 120 may be adapted to process the sensor signals to determine sensor information indicating a motion compensated acceleration, an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map. For example, user interface 120 may be adapted to display a time series of positions, headings, and/or attitudes of mobile structure 101 overlaid on a geographical map, which may include one or more graphs indicating a corresponding time series of stabilized attitude estimates, actuator control signals, and/or other sensor and/or control signals.

In some embodiments, user interface 120 may be adapted to accept user input including a user-defined target heading, route, and/or attitude for mobile structure 101, for example, and to generate control signals for steering sensor/actuator 150 and/or propulsion system 170 to cause mobile structure 101 to move according to the target heading, route, and/or attitude. In further embodiments, user interface 120 may be adapted to accept user input including a user-defined target attitude for an actuated device (e.g., other modules 180) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, and/or other device capable of measuring a linear speed of mobile structure 101 (e.g., in a surrounding medium and/or aligned with a longitudinal axis of mobile structure 101) and providing such measurements as sensor signals that may be communicated to various devices of system 100.

Gyroscope 144 and/or accelerometer 145 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope 144 and/or accelerometer 145 may be positioned and/or adapted to make such measurements in relation to a particular coordinate frame of mobile structure 101, for example. In various embodiments, gyroscope 144 and accelerometer 145 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated and coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, a sonar system, and/or other environmental sensors providing measurements and/or other sensor signals that can be displayed to a user and/or used by other devices of system 100 (e.g., controller 130) to provide operational control of mobile structure 101 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing stabilized attitude estimates, for example, or for transmitting and/or receiving communications, such as sensor signals, sensor information, and/or control signals, between one or more devices of system 100. In one embodiment, such method may include instructions to receive an angular velocity, acceleration, and/or speed of mobile structure 101 from various sensors, to determine an estimated absolute coordinate frame (e.g., estimated absolute roll and/or pitch) from the sensor signals, and/or to determine a stabilized attitude estimate from the estimated absolute coordinate frame and one or more sensor signals, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various measurements of magnetic fields and accelerations. For example, gyroscope 144, accelerometer 145, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads.

In various embodiments, a logic device of system 100 (e.g., of gyroscope 144, accelerometer 145, and/or other elements of system 100) may be adapted to determine parameters (e.g., using signals from various devices of system 100) for transforming a coordinate frame of gyroscope 144 and/or accelerometer 145 to/from a coordinate frame of mobile structure 101, at-rest and/or in-motion, and/or other coordinate frames, as described herein. One or more logic devices of system 100 may be adapted to use such parameters to transform a coordinate frame of gyroscope 144 and/or accelerometer 145 to/from a coordinate frame of orientation sensor 140 and/or mobile structure 101, for example. Furthermore, such parameters may be used to determine and/or calculate one or more adjustments to an orientation of gyroscope 144 and/or accelerometer 145 that would be necessary to physically align a coordinate frame of gyroscope 144 and/or accelerometer 145 with a coordinate frame of orientation sensor 140 and/or mobile structure 101. Adjustments determined from such parameters may be used to selectively power adjustment servos (e.g., of gyroscope 144 and/or accelerometer 145 and/or other sensors or elements of system 100), for example, or may be communicated to a user through user interface 120, as described herein.

Figure 2:
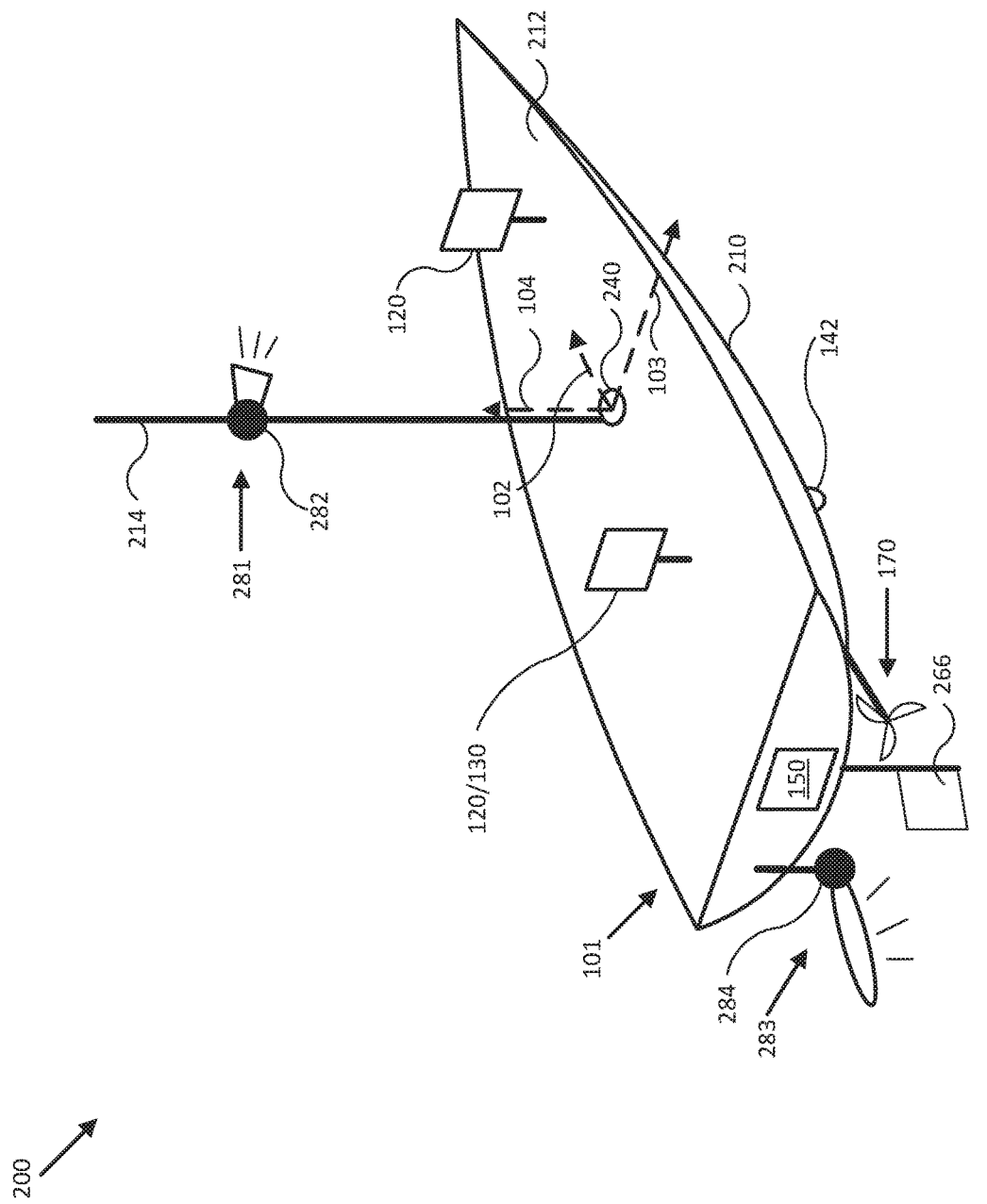
FIG. 2 illustrates a diagram of an attitude estimation system in accordance with an embodiment of the disclosure.

FIG. 2 illustrates a diagram of an attitude estimation system 200 in accordance with an embodiment of the disclosure. In the embodiment shown in FIG. 2, system 200 may be implemented to provide stabilized attitude estimates for mobile structure 101, similar to system 100 of FIG. 1. For example, system 200 may include sensor cluster 240 (e.g., gyroscope 144, accelerometer 145, GPS 146), user interface/controller 120/130, secondary user interface 120, steering sensor/actuator 150, and various other sensors and/or actuators. In the embodiment illustrated by FIG. 2, mobile structure 101 is implemented as a motorized boat including a hull 210, a deck 212, a mast/sensor mount 214, a rudder 266, an inboard motor 170, an actuated spotlight 281, and an actuated sonar system 283. In other embodiments, hull 210, deck 212, mast/sensor mount 214, rudder 266, inboard motor 170, and actuated devices 281 and 283 may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 2, mobile structure 101 includes actuated spotlight 281 coupled to mobile structure 101 through actuator 282 and actuated sonar system 283 coupled to mobile structure 101 through actuator 284. In some embodiments, actuators 282 and 285 may be implemented as roll, pitch, and/or yaw actuators, for example, and may be adapted to adjust an orientation of their coupled devices according to control signals and/or a stabilized attitude estimate provided by user interface/controller 120/130. For example, user interface/controller 120/130 may be adapted to receive an orientation of actuated spotlight 281 configured to illuminate a position in surrounding water and/or a direction referenced to an absolute coordinate frame, and to adjust an orientation of actuated spotlight 281 to retain illumination of the position and/or direction in response to motion of mobile structure 101, using one or more stabilized attitude estimates for mobile structure 101 and/or other sensor information derived by executing the various methods described herein. In another embodiment, user interface/controller 120/130 may be configured to adjust an orientation of actuated sonar system 283 to direct sonar transmissions from actuated sonar system 283 substantially downwards and/or along a pre-determined underwater track during motion of mobile structure 101, using one or more stabilized attitude estimates for mobile structure 101 and/or other sensor information.

In one embodiment, user interfaces 120 may be mounted to mobile structure 101 substantially on deck 212 and/or mast/sensor mount 214. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 212) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 2, in some embodiments, speed sensor 142 may be mounted to a portion of mobile structure 101 substantially below a typical user level, such as to hull 210, and be adapted to measure a relative water speed. Speed sensor 142 may be adapted to provide a thin profile to reduce and/or avoid water drag. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 210.

In the embodiment illustrated by FIG. 2, mobile structure 101 includes direction/longitudinal axis 102, direction/lateral axis 103, and direction/vertical axis 104 meeting approximately at mast/sensor mount 214 (e.g., near a center of gravity of mobile structure 101). In one embodiment, the various axes may define a coordinate frame of mobile structure 101 and/or sensor cluster 240. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 200 and/or mobile structure 101. Each element of system 200 may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101. As noted herein, each element of system 200 may be implemented with an antenna, a logic device, and/or other analog and/or digital components enabling that element to provide, receive, and process sensor signals and interface or communicate with one or more devices of system 200. Further, a logic device of that element may be adapted to perform any of the methods described herein.

Figure 3A:
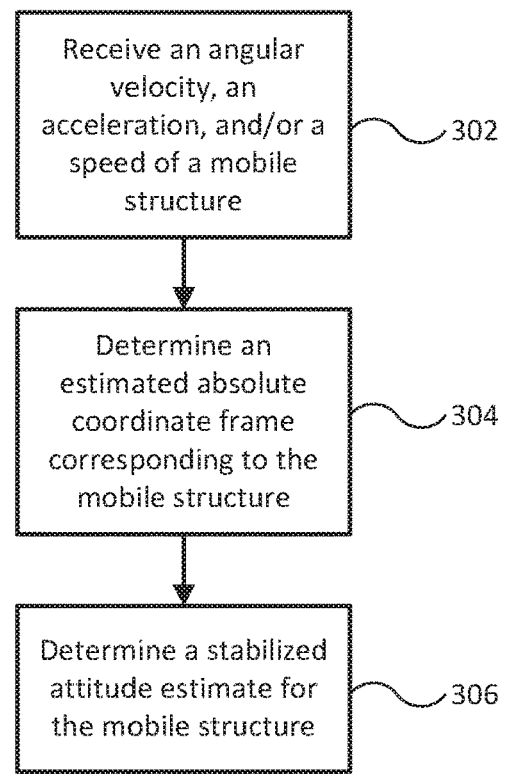
FIGS. 3A-3B illustrate flow diagrams of various operations to provide attitude estimation in accordance with embodiments of the disclosure.
Figure 3B:
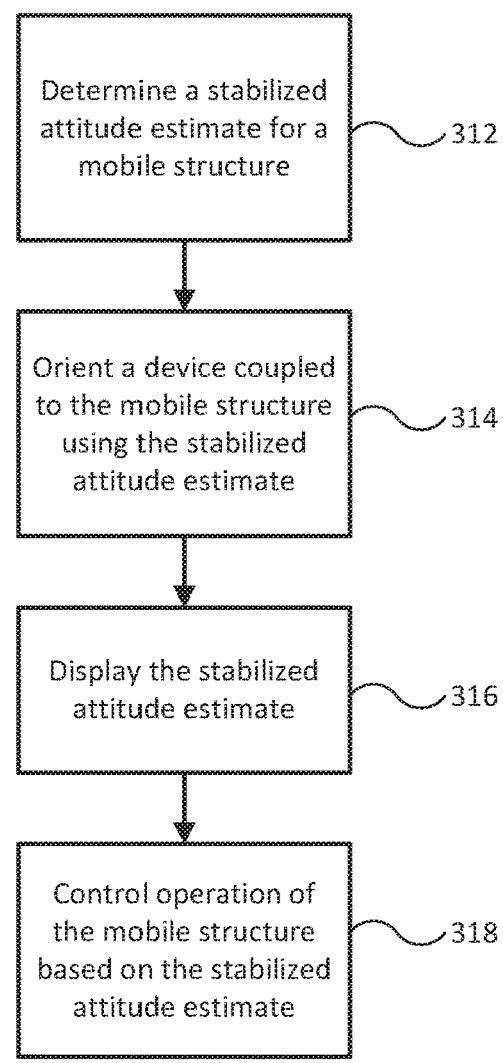

FIGS. 3A-B illustrate flow diagrams of respective processes 300A and 300B to provide stabilized attitude estimates for mobile structure 101 in accordance with embodiments of the disclosure. In some embodiments, the operations of FIGS. 3A-B may be implemented as software instructions executed by one or more logic devices associated with corresponding electronic devices and/or sensors of system 100 of FIG. 1 and/or system 200 of FIG. 2. More generally, the operations of FIGS. 3A-B may be implemented with any combination of software instructions and/or electronic hardware (e.g., inductors, capacitors, amplifiers, or other analog and/or digital components).

It should be appreciated that any step, sub-step, sub-process, or block of processes 300A and 300B may be performed in an order or arrangement different from the embodiments illustrated by respective FIGS. 3A-B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories of systems 100 and/or 200 prior to moving to a following portion of a corresponding process. Although processes 300A and 300B are described with reference to systems 100 and 200, processes 300A and 300B may be performed by other systems different from systems 100 and 200 and including a different selection of electronic devices, sensors, mobile structures, and/or mobile structure attributes.

Process 300A represents a method for providing stabilized attitude estimates for mobile structure 101 using attitude estimation systems 100 and/or 200 in accordance with embodiments of the disclosure. At the initiation of process 300A, various system parameters may be populated by prior execution of a process similar to process 300A, for example, or may be initialized to zero and/or one or more values corresponding to typical, stored, and/or learned values derived from past operation of process 300A, as described herein.

In block 302, a logic device receives an angular velocity, an acceleration, and/or a speed of a mobile structure. For example, controller 130 of attitude estimation system 100 may be configured to receive an angular velocity measurement from gyroscope 144, an acceleration measurement from accelerometer 145, and/or a speed measurement from speed sensor 142, where each of the sensors may be coupled to mobile structure 101. In some embodiments, controller 130 may be configured to receive a series of angular position measurements from gyroscope 144, for example, and derive the angular velocity by subtracting a prior angular position from a present angular position. In such embodiments, the prior angular position may be bias adjusted using one or more bias adjustment factors, as described more fully with respect to block 306.

In various embodiments, controller 130 may be configured to receive a time series of positions of mobile structure 101 from GPS 146, for example, and determine a derived speed from the series of positions (e.g., by subtracting one or more prior position measurements from a present position measurement, and/or using other methods to derive a speed from a time series of positions). In some embodiments, controller 130 may be adapted to select the measured speed or the derived speed as the speed of mobile structure 101 (e.g., the calculated speed) based on which value is larger, for example, or on which value is available. In further embodiments, controller 130 may be adapted to determine the speed of mobile structure by interpolating, averaging, filtering, and/or otherwise processing the measured speed and/or the derived speed. In general, controller 130 may be configured to interpolate, average, filter, and/or otherwise process one or more of the measurements prior to proceeding to block 304.

In block 304, a logic device determines an estimated absolute coordinate frame corresponding to a mobile structure. For example, controller 130 may be configured to determine an estimated absolute coordinate frame relative to mobile structure 101 based, at least in part, on the angular velocity, the acceleration, and/or the speed from block 302. In some embodiments, the estimated absolute coordinate frame may correspond to/be characterized by an estimated absolute roll and/or pitch of mobile structure 101, for example, and controller 130 may be configured to determine the estimated absolute roll and/or pitch from a motion compensated acceleration of mobile structure 101. In various embodiments, controller 130 may be configured to determine the motion compensated acceleration by removing a centripetal acceleration of mobile structure 101 from the acceleration received in block 302.

For example, controller 130 may be configured to determine the lateral component of the motion compensated acceleration by multiplying the speed from block 302 with the yaw component of the angular velocity and subtracting the result from the lateral component of the acceleration from block 302. Controller 130 may also be configured to determine the vertical component of the motion compensated acceleration by multiplying the speed from block 302 with the pitch component of the angular velocity and adding the result to the vertical component of the acceleration from block 302. The addition and/or subtraction of the various centripetal acceleration components may depend on the coordinate frame convention used to characterize the various directional measurements. In some embodiments, controller 130 may be configured to determine the longitudinal component of the motion compensated acceleration by subtracting a time derivative of the speed from block 302, for example.

In various embodiments, controller 130 may be configured to select a computed yaw rate as the yaw component of the angular velocity from block 302 prior to determining the lateral component of the motion compensated acceleration. In some embodiments, controller 130 may be configured to determine the computed yaw rate by deadband filtering the yaw component of the angular velocity, where the deadband may be selected as a constant and/or adjusted based on current environmental conditions and/or adaptive learning from prior execution of process 300A. In other embodiments, controller 130 may be configured to determine the computed yaw rate by deriving a yaw rate from a time series of positions of mobile structure 101 (e.g., provided by GPS 146), and assuming a longitudinal axis of mobile structure 101 approximately follows a track corresponding to the time series of positions. In still further embodiments, controller 130 may be configured to determine the computed yaw rate by interpolating, averaging, filtering, and/or otherwise processing the yaw component of the angular velocity from block 302, the deadband filtered yaw component of the angular velocity, and/or the derived yaw component of the angular velocity.

In various embodiments, controller 130 may be configured to determine the estimated absolute roll of mobile structure 101 by computing the ratio of the lateral component of the motion compensated acceleration to the vertical component of the motion compensated acceleration. Controller 130 may be configured to determine the estimated absolute pitch of mobile structure 101 by first transforming the motion compensated acceleration to a rotated reference frame and then computing the ratio of the longitudinal component of the transformed motion compensated acceleration to the vertical component of the transformed motion compensated acceleration. In such embodiments, the transformation corresponds to rotating the coordinate frame of the motion compensated acceleration (e.g., the coordinate frame of accelerometer 145 and/or mobile structure 101) about its longitudinal axis by an angle with a magnitude equal to the estimated absolute roll. In other embodiments, the estimated absolute pitch may be determined first, the coordinate frame rotated by the magnitude of the estimated absolute pitch about the lateral axis, and then the estimated absolute roll determined. The order of determining the angles, and the inclusion/exclusion of an estimated absolute yaw, may be adapted to correspond to a variety of coordinate frame/transformation conventions. Once the estimated absolute roll and/or pitch are determined (and, in some embodiments, an estimated absolute yaw corresponding to heading angle 107 of FIG. 1, for example), the estimated absolute coordinate frame is fully characterized/determined.

In block 306, a logic device determines a stabilized attitude estimate for a mobile structure. For example, controller 130 may be configured to determine a stabilized attitude estimate for mobile system 101 from the angular velocity from block 302 and/or 304 and the estimated absolute coordinate frame (estimated absolute roll, pitch, and/or yaw) from block 304. In one embodiment, controller 130 may be configured to use the estimated absolute roll and/or pitch to transform the angular velocity to the estimated absolute coordinate frame (e.g., using a coordinate frame transformation based on the estimated absolute roll and/or pitch), and controller 130 may be configured to integrate the transformed angular velocity with respect to time to determine an attitude change of mobile structure 101 that is referenced to the estimated absolute coordinate frame. In some embodiments, controller 130 may be configured to add the attitude change to a prior-determined stabilized attitude estimate to determine the present stabilized attitude estimate. In one embodiment, the prior stabilized attitude estimate may be an initialization attitude, for example, and/or may correspond to the estimated absolute coordinate frame.

In some embodiments, controller 130 may be configured to refine the stabilized attitude estimate by adding in a contribution derived from an estimated absolute angular velocity based on the estimated absolute coordinate frame and a prior stabilized attitude estimate. For example, controller 130 may be configured to determine the estimated absolute angular velocity by subtracting the prior stabilized attitude estimate from the estimated absolute roll, pitch, and/or yaw. In such embodiments, controller 130 may be configured to scale the estimated absolute angular velocity by a crossover time constant, integrate the scaled estimated absolute angular velocity with respect to time, and then add the result to the angular velocity-derived attitude change and the prior stabilized attitude estimate to determine the stabilized attitude estimate. As noted herein, the resulting stabilized attitude estimate is primarily determined by the angular velocity-derived attitude change, but is biased towards the actual absolute coordinate frame using the estimated absolute angular velocity.

In various embodiments, the estimated absolute coordinate frame may correspond to a horizontal plane local to mobile structure 101. In some embodiments, the estimated absolute coordinate frame may include a defined yaw reference, such as Magnetic North, and the stabilized attitude estimate may correspond to a stabilized roll, pitch, and yaw estimate referenced to the horizontal plane and the yaw reference. In other embodiments, the estimated absolute coordinate frame may include an undefined yaw reference, and the stabilized attitude estimate may correspond to a stabilized roll and pitch estimate referenced to the horizontal plane.

To help reduce errors in the stabilized attitude estimate due to sensor drift, particularly with respect to angular orientations and/or velocities provided by gyroscope 144, controller 130 may be configured to determine one or more bias correction factors (e.g., one per component of the angular velocity) to add to the angular measurements. In one embodiment, the bias correction factors may be based on the estimated absolute coordinate frame from block 304 and the stabilized attitude estimate. For example, controller 130 may be configured to determine the bias correction factors by subtracting the stabilized attitude estimate from the estimated absolute roll, pitch, and/or yaw, scaling the result by a bias time constant, integrating the scaled result over time to produce corresponding bias correction factor updates, and subtracting the bias correction factor updates from prior bias correction factors. In one embodiment, the prior bias correction factors may be initialization bias correction factors (e.g., zeros), for example, and/or may correspond to a prior angular position provided by gyroscope 144.

To help reduce a risk of accumulating errors in the bias correction factors, controller 130 may be configured to calculate the bias correction factor updates when mobile structure 101 is in a bias accumulation state, where the bias accumulation state may be defined as a state of mobile structure 101 where the speed, angular velocity, and/or centripetal acceleration are below one or more corresponding limits. In some embodiments, the limits may be predefined, for example, may be selected by a user, or may be adjusted programmatically according to a level of volatility in the bias correction factors. In various embodiments, controller 130 may be configured to determine, from the angular velocity and/or speed from block 302 or 304, that mobile structure 101 is in a bias accumulation state, and then to update the bias correction factors, as described herein, only when mobile structure 101 is in a bias accumulation state. The updated bias correction factors may then be used to determine bias corrected angular velocities from future angular measurements (e.g., angular positions and/or velocities provided by gyroscope 144).

It is contemplated that any one or combination of methods to determine the stabilized attitude estimate may be performed according to one or more operating contexts of a control loop, for example, such as a startup, learning, running, and/or other type operating context. For example, process 300A may proceed back to block 302 and proceed through process 300A again to produce an updated stabilized attitude estimate and/or one or more bias correction factors, as in a control loop.

Process 300B represents a method for providing attitude adjustments for systems 100 and/or 200 using stabilized attitude estimates in accordance with embodiments of the disclosure. At the initiation of process 300B, various system parameters may be populated by prior execution of a process similar to process 300A and/or 300B, for example, or may be initialized to zero and/or one or more values corresponding to typical, stored, and/or learned values derived from past operation of process 300A and/or 300B, as described herein.

In block 312, a logic device determines a stabilized attitude estimate for a mobile structure. Block 412 is substantially similar to process 300A of FIG. 3A and can be performed similarly.

In optional block 314, a logic device orients a device coupled to the mobile structure using a stabilized attitude estimate. For example, controller 130 may be configured to orient actuated spotlight 381 of system 200 using the stabilized attitude estimate from block 312. In some embodiments, a user may select an absolute and/or relative orientation (roll, pitch, and/or yaw) of actuated spotlight 381 through one or more user inputs received by user interface 120, for example, and controller 130 may be configured to use stabilized attitude estimates from block 312 to adjust the orientation of actuated spotlight 381 (e.g., using control signals transmitted to actuator 382) to substantially match the selected orientation as mobile structure 101 moves. In other embodiments, a user may select an absolute and/or relative position in an area near mobile structure 101, for example, and controller 130 may be configured to use stabilized attitude estimates from block 312 to adjust the orientation of actuated spotlight 381 to illuminate/aim actuated spotlight 381 substantially towards the selected position as mobile structure 101 moves.

In optional block 316, a logic device displays a stabilized attitude estimate. For example, controller 130 may be configured to display the stabilized attitude estimate from block 312 to a user using a display of user interface 120. In some embodiments, controller 130 may collect a time series of stabilized attitude estimates and display a graph of the time series as part of, next to, or overlaid on a map of a route of mobile structure 101. In other embodiments, controller 130 may display the time series with or without other sensor information.

In optional block 318, a logic device controls operation of a mobile structure based on a stabilized attitude estimate. For example, controller 130 may be configured to control operation of mobile structure 101 and/or any other elements of system 100 and/or 200 based on the stabilized attitude estimate from block 312. In some embodiments, a user may select a desired absolute and/or relative orientation (roll, pitch, and/or yaw) and/or range of orientations of mobile structure 101, one or more sensors and/or actuated devices of system 100 and/or 200, and/or other elements of system 100 and/or 200 using user interface 120, for example, and controller 130 may be configured to use stabilized attitude estimates from block 312 to adjust the orientation of mobile structure 101 and/or the other sensors, devices, or elements of system 100 and/or 200 (e.g., using control signals transmitted to various actuators, steering sensor/actuator 150, and/or propulsion system 170) to substantially match and/or fall within the selected orientation or orientation range as mobile structure 101 moves. For example, a user may select a maximum roll and/or pitch and a heading for mobile structure 101, and controller 130 may be configured to control steering sensor/actuator 150 and/or propulsion system 170 to adjust motion of mobile structure 101 to fall substantially within the selected maximum roll and/or pitch while steering mobile structure 101 towards the selected heading.

It is contemplated that any one or combination of methods to provide attitude adjustments using stabilized attitude estimates may be performed according to one or more operating contexts of a control loop, for example, such as a startup, learning, running, and/or other type operating context. For example, process 300B may proceed back to block 312 and proceed through process 300B again to provide updated attitude adjustments, as in a control loop.

Embodiments of the present disclosure can thus provide reliable and accurate stabilized attitude estimations using speed, angular velocity, and/or acceleration measurements provided by inexpensive sensors. Such embodiments may be used to provide attitude adjustments for a mobile structure and/or systems, devices, and/or sensors coupled to the mobile structure without the additional cost and maintenance typically required by conventional systems that rely on relatively fragile and complex mechanisms and computations to determine attitude estimations for mobile structures.

FIGS. 4-8 illustrate flow diagrams and/or control loops of respective processes 400-800 to provide stabilized attitude estimates for mobile structure 101 in accordance with embodiments of the disclosure. In some embodiments, the operations of FIGS. 4-8 may be implemented as software instructions executed by one or more logic devices associated with corresponding electronic devices and/or sensors of system 100 of FIG. 1 and/or system 200 of FIG. 2. More generally, the operations of FIGS. 4-8 may be implemented with any combination of software instructions and/or electronic hardware (e.g., inductors, capacitors, amplifiers, or other analog and/or digital components).

It should be appreciated that any step, sub-step, sub-process, or block of processes 400-800 may be performed in an order or arrangement different from the embodiments illustrated by respective FIGS. 4-8. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100 and/or 200 prior to proceeding to a following portion of a corresponding process. Although processes 400-800 are described with reference to systems 100 and 200, processes 400-800 may be performed by other systems different from systems 100 and 200, and including a different selection of electronic devices, sensors, mobile structures, and/or mobile structure attributes.

Figure 4:
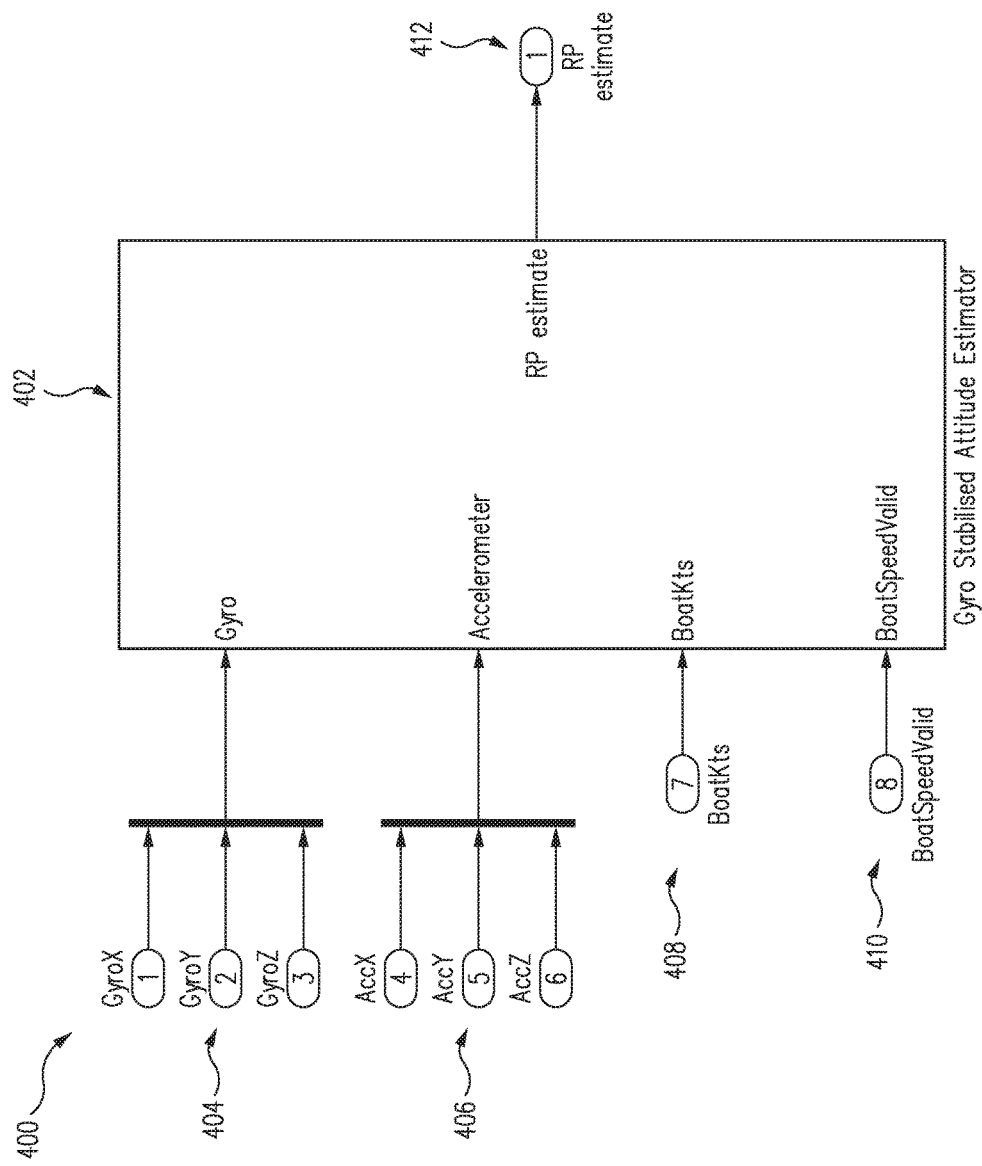
FIGS. 4-7 illustrate flow diagrams of various control loops and other operations to provide attitude estimation in accordance with embodiments of the disclosure.

Process 400 of FIG. 4 illustrates an embodiment of a top level view of a process to provide stabilized attitude estimates. In some embodiments, process 400 may include sensor inputs 404-408 (e.g., angular positions 404 from gyroscope 144, accelerations 406 from accelerometer 145, speeds 408 from speed sensor 142), a speed validity indicator 408 (e.g., configured to indicate a valid and/or accurate speed is being provided by speed sensor 142), stabilized attitude estimator logic block 402 (e.g., expanded upon in FIG. 5), outputs 412 (e.g., a stabilized attitude estimate), and/or various filters, switching blocks, and math function blocks, as shown.

Figure 5:
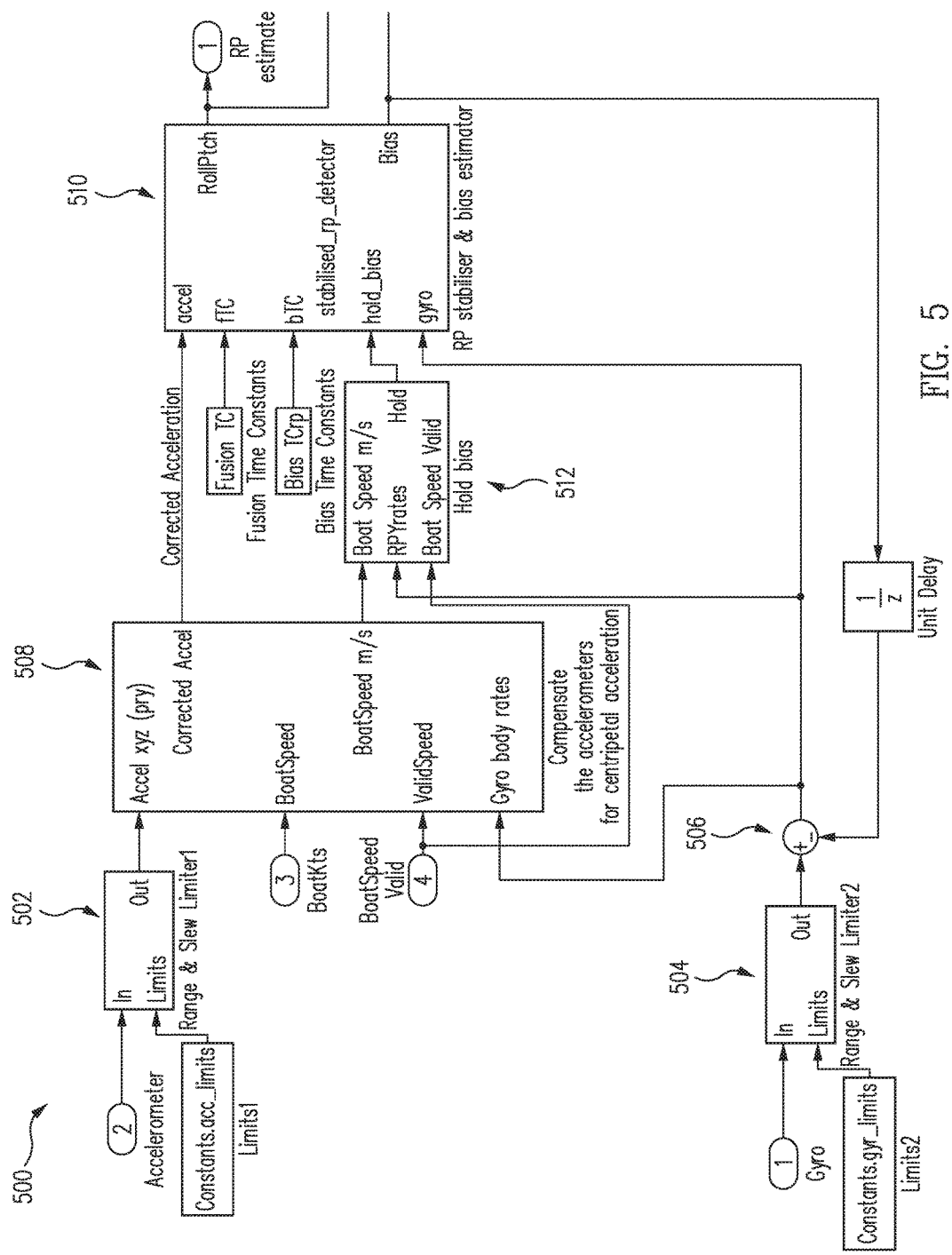

Process 500 of FIG. 5 illustrates an embodiment of an intermediate level view of a process to provide stabilized attitude estimates. In some embodiments, process 500 may include range and slew rate limiter filter logic blocks 502 and 504, a combinatorial logic block 506 (e.g., configured to convert filtered angular positions provided by logic block 504 to a bias corrected angular velocity), motion compensated acceleration logic block 508 (e.g., expanded upon in FIG. 6), bias accumulation state detector logic block 512 (e.g., expanded upon in FIG. 7), stabilized attitude and bias estimator logic block 510 (e.g., expanded upon in FIG. 8), and/or various filters, switching blocks, and math function blocks, as shown.

Figure 6:
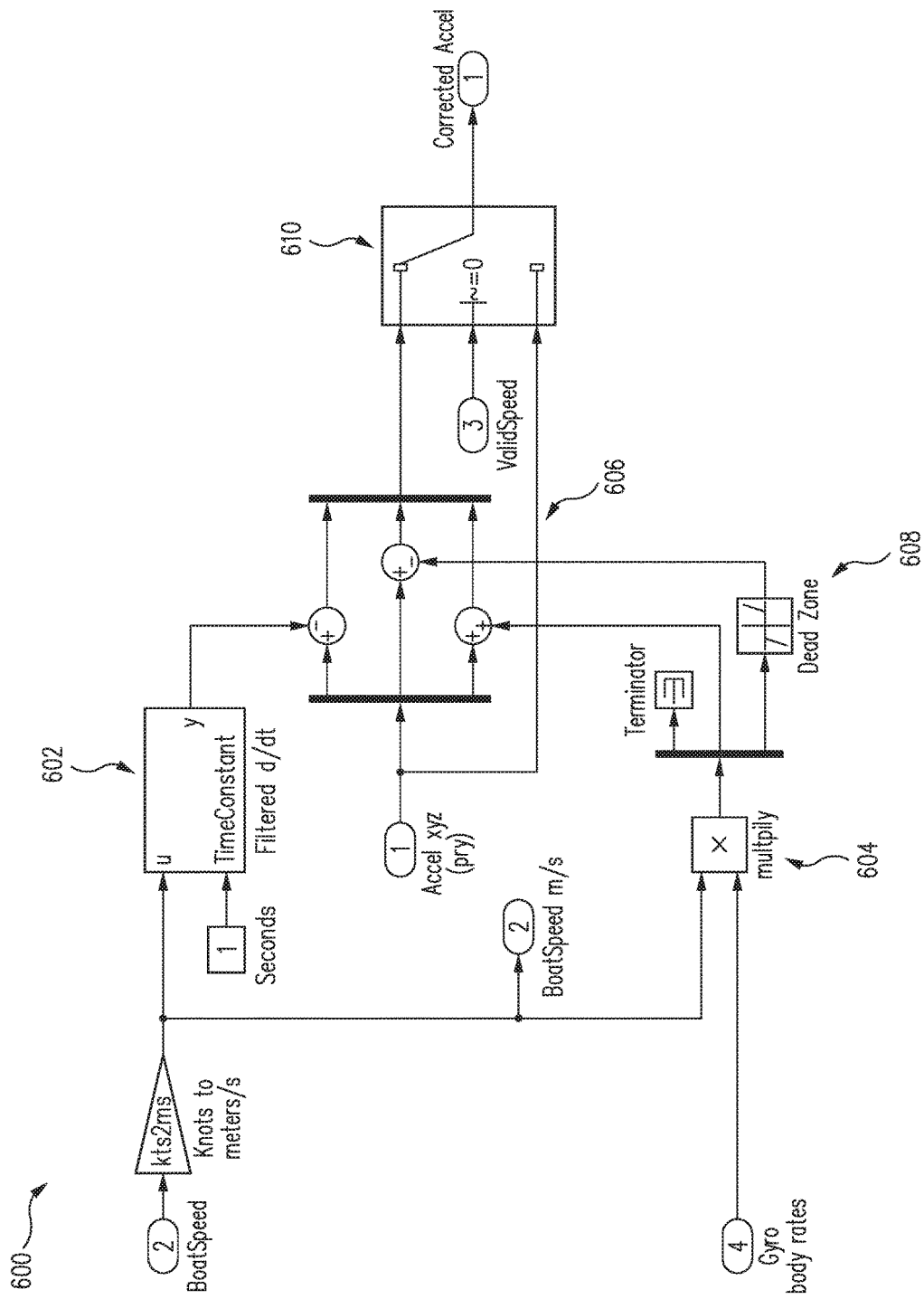

Process 600 of FIG. 6 illustrates an embodiment of a bottom level view of a process to provide stabilized attitude estimates. In some embodiments, process 600 may include filtered derivative logic block 602 (e.g., configured to determine a longitudinal acceleration correction based on speeds from speed sensor 142), product logic block 604 (e.g., configured to determine various centripetal acceleration contributions to the acceleration provided by accelerometer 145), component product logic block 606 (configured to remove the centripetal acceleration from the acceleration provided by accelerometer 145 and/or otherwise compute a motion compensated acceleration), deadband filter logic block 608 (e.g., configured to apply a deadband filter to a yaw component of the angular velocity and/or centripetal acceleration), switch logic block 610 (e.g., configured to treat the acceleration provided by accelerometer 145 as the motion compensated acceleration if the speed provided by speed sensor 142 is invalid), and/or various filters, switching blocks, and math function blocks, as shown.

Figure 7:
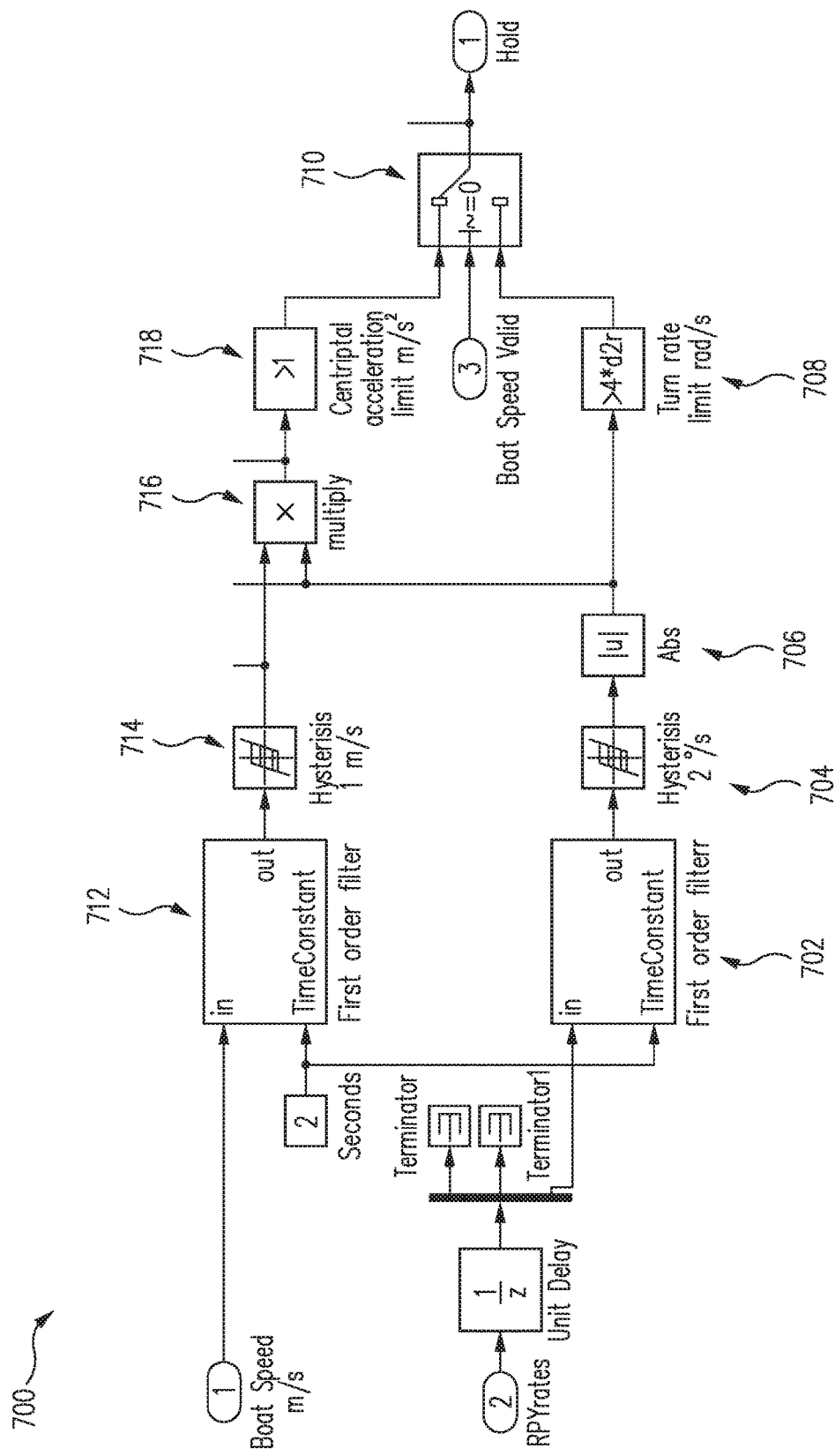

Process 700 of FIG. 7 illustrates an embodiment of a bottom level view of a process to provide stabilized attitude estimates. In some embodiments, process 700 may include first order filter logic blocks 702 and 712, hysteresis/backlash filter logic blocks 704 and 714 (e.g., configured to provide a moving deadband comparable to backlash in a physical system), magnitude logic block 706, excursion detection logic block 708 (e.g., configured to detect when a yaw component of the angular velocity is high enough to risk error accumulation in the one or more bias correction factors), selector logic block 710 (e.g., configured to select an excursion detection output based on the validity of a speed provided by speed sensor 142) product logic block 716 (e.g., configured to estimate the centripetal acceleration of mobile structure 101), excursion detection logic block 718 (e.g., configured to detect when the estimated centripetal acceleration is high enough to risk error accumulation in the one or more bias correction factors), and/or various filters, switching blocks, and math function blocks, as shown.

Process 800 of FIG. 8 illustrates an embodiment of a bottom level view of a process to provide stabilized attitude estimates. In some embodiments, process 700 may include code section 802 (e.g., configured to determine an estimated absolute coordinate frame based on the motion compensated acceleration), code section 804 (e.g., configured to initialize the stabilized attitude estimate and the bias correction factors), code section 806 (e.g., configured to determine the stabilized attitude estimate from the angular acceleration, the estimated absolute coordinate frame, and a prior stabilized attitude estimate), code section 808 (e.g., configured to determine bias correction factors from the estimated absolute coordinate frame, the stabilized attitude estimate, and prior bias correction factors, and/or various initialization and/or other code sections, as shown.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals from one or more sensors mounted on a mobile structure, and determine a stabilized attitude estimate for the mobile structure, wherein the logic device is adapted to:
receive an angular velocity, an acceleration, and a speed of the mobile structure;
determine a motion compensated acceleration of the mobile structure from the acceleration of the mobile structure and, at least in part, the angular velocity and/or speed;
determine an estimated absolute coordinate frame based on the motion compensated acceleration and, at least in part, the angular velocity, and/or the speed;
determine the stabilized attitude estimate based, at least in part, on the angular velocity and the estimated absolute coordinate frame; and
control operation of the mobile structure based, at least in part, on the stabilized attitude estimate.

2. The system of claim 1, wherein the speed of the mobile structure comprises a calculated speed based, at least in part, on a measured speed and/or a global positioning satellite-derived speed.

3. The system of claim 1, wherein:
the angular velocity comprises a bias corrected angular velocity based, at least in part, on one or more bias correction factors; and the one or more bias correction factors are based, at least in part, on a prior estimated absolute coordinate frame and a prior stabilized attitude estimate.

4. The system of claim 3, wherein the logic device is adapted to:
determine, from the angular velocity and/or speed, that the mobile structure is in a bias accumulation state; and
update the one or more bias correction factors based, at least in part, on the estimated absolute coordinate frame and the stabilized attitude estimate.

5. The system of claim 1, wherein the estimated absolute coordinate frame corresponds to an estimated absolute roll and/or pitch of the mobile structure, and wherein the logic device is adapted to:
determine the motion compensated acceleration of the mobile structure by removing a centripetal acceleration of the mobile structure from the acceleration of the mobile structure; and
determine the estimated absolute roll and/or pitch based, at least in part, on the motion compensated acceleration of the mobile structure.

6. The system of claim 5, wherein the determining the estimated absolute roll and/or pitch of the mobile structure comprises:
determining the estimated absolute roll, wherein the estimated absolute roll is based, at least in part, on a ratio of a lateral component of the motion compensated acceleration to a vertical component of the motion compensated acceleration;
transforming the motion compensated acceleration to a rotated reference frame by rotating a coordinate frame of the motion compensated acceleration about a longitudinal axis of the coordinate frame, wherein a magnitude of the rotation is substantially equal to the estimated absolute roll; and
determining the estimated absolute pitch, wherein the estimated absolute pitch is based, at least in part, on a ratio of a longitudinal component of the transformed motion compensated acceleration to a vertical component of the transformed motion compensated acceleration.

7. The system of claim 5, wherein the logic device is adapted to:
determine a longitudinal component of the motion compensated acceleration based, at least in part, on a time derivative of the speed; and
determine lateral and vertical components of the motion compensated acceleration based, at least in part, on respective products of the speed with yaw and pitch components of the angular velocity.

8. The system of claim 7, wherein the yaw component of the angular velocity comprises a computed yaw rate based, at least in part, on a deadband filtered yaw component of the angular velocity and/or a global positioning satellite-derived yaw component of the angular velocity.

9. The system of claim 1, wherein the logic device is adapted to:
determine an estimated absolute angular velocity based, at least in part, on the estimated absolute coordinate frame and a prior stabilized attitude estimate; and
determine the stabilized attitude estimate based on the estimated absolute angular velocity.

10. The system of claim 1, wherein:
the mobile structure comprises a watercraft, aircraft, robot, drone, and/or a type of vehicle;
the estimated absolute coordinate frame corresponds to a horizontal plane local to the mobile structure and comprises an undefined yaw reference;
the stabilized attitude estimate corresponds to a stabilized roll and pitch estimate referenced to the horizontal plane; and
the logic device is adapted to transform the angular velocity to the estimated absolute coordinate frame and determine the stabilized attitude estimate based, at least in part, on the transformed angular velocity.

11. A method comprising:
receiving one or more sensor signals from one or more sensors mounted on a mobile structure, representing an angular velocity, an acceleration, and a speed of the mobile structure;
determining a motion compensated acceleration of the mobile structure from the acceleration of the mobile structure and, at least in part, the angular velocity and/or speed;
determining an estimated absolute coordinate frame based on the motion compensated acceleration and, at least in part, an angular velocity, and/or a speed of the mobile structure;
determining a stabilized attitude estimate for the mobile structure based, at least in part, on the angular velocity and the estimated absolute coordinate frame; and
controlling operation of the mobile structure based, at least in part, on the stabilized attitude estimate.

12. The method of claim 11, wherein the speed of the mobile structure comprises a calculated speed based, at least in part, on a measured speed and/or a global positioning satellite-derived speed.

13. The method of claim 11, wherein:
the angular velocity comprises a bias corrected angular velocity based, at least in part, on one or more bias correction factors; and
the one or more bias correction factors are based, at least in part, on a prior estimated absolute coordinate frame and a prior stabilized attitude estimate.

14. The method of claim 13, further comprising:
determining, from the angular velocity and/or speed, that the mobile structure is in a bias accumulation state; and
updating the one or more bias correction factors based, at least in part, on the estimated absolute coordinate frame and the stabilized attitude estimate.

15. The method of claim 11, wherein the estimated absolute coordinate frame corresponds to an estimated absolute roll and pitch of the mobile structure, the method further comprising:
determining the motion compensated acceleration of the mobile structure by removing a centripetal acceleration of the mobile structure from the acceleration of the mobile structure; and
determining the estimated absolute roll and pitch based, at least in part, on the motion compensated acceleration of the mobile structure.

16. The method of claim 15, wherein the determining the estimated absolute roll and pitch of the mobile structure comprises:
determining the estimated absolute roll, wherein the estimated absolute roll is based, at least in part, on a ratio of a lateral component of the motion compensated acceleration to a vertical component of the motion compensated acceleration;
transforming the motion compensated acceleration to a rotated reference frame by rotating a coordinate frame of the motion compensated acceleration about a longitudinal component of the coordinate frame, wherein a magnitude of the rotation is substantially equal to the estimated absolute roll; and determining the estimated absolute pitch, wherein the estimated absolute pitch is based, at least in part, on a ratio of a longitudinal component of the transformed motion compensated acceleration to a vertical component of the transformed motion compensated acceleration.

17. The method of claim 15, further comprising:

determining a longitudinal component of the motion compensated acceleration based, at least in part, on a time derivative of the speed; and determining lateral and vertical components of the motion compensated acceleration based, at least in part, on respective products of the speed with yaw and pitch components of the angular velocity.

18. The method of claim 17, wherein the yaw component of the angular velocity comprises a computed yaw rate based, at least in part, on a deadband filtered yaw component of the angular velocity and/or a global positioning satellite-derived yaw component of the angular velocity.

19. The method of claim 11, further comprising:

determining an estimated absolute angular velocity based, at least in part, on the estimated absolute coordinate frame and a prior stabilized attitude estimate; and determining the stabilized attitude estimate based on the estimated absolute angular velocity.

20. The method of claim 11, further comprising:

transforming the angular velocity to the estimated absolute coordinate frame; and determining the stabilized attitude estimate based, at least in part, on the transformed angular velocity.

* * * * *